United States Patent [19]

Ball et al.

[11] Patent Number: 5,164,468

[45] Date of Patent: Nov. 17, 1992

[54] POLYMERS DERIVED FROM α, β-UNSATURATED POLYCARBOXYLIC ACIDS OR ANHYDRIDES AND N-SUBSTITUTED ACRYLAMIDES, AND USE IN REDUCING SCALE

[75] Inventors: Lawrence E. Ball, Akron; Abolghassem Eskamani; Eleanor J. Fendler, both of Hudson, all of Ohio

[73] Assignee: The Standard Oil Company, Cleveland, Ohio

[21] Appl. No.: 577,905

[22] Filed: Sep. 5, 1990

[51] Int. Cl.$^5$ .................... C08F 222/04; C08F 220/54
[52] U.S. Cl. .................................. 526/271; 526/307.4
[58] Field of Search ......................................... 526/271

[56] References Cited

U.S. PATENT DOCUMENTS

| | | |
|---|---|---|
| 2,723,956 | 11/1955 | Johnson . |
| 3,277,116 | 10/1966 | Young et al. . |
| 3,289,734 | 12/1966 | Robertson . |
| 3,293,152 | 12/1966 | Herbert et al. . |
| 3,359,246 | 12/1967 | Berry . |
| 3,423,373 | 1/1969 | Verdol et al. ........... 260/78.5 |
| 3,444,054 | 5/1969 | Salutsky .................. 203/7 |
| 3,514,376 | 5/1970 | Salutsky .................. 203/7 |
| 3,617,577 | 11/1971 | King ........................ 210/58 |
| 3,650,970 | 3/1972 | Pratt et al. ............. 252/181 |
| 3,715,307 | 2/1973 | Johnson et al. ........ 210/58 |
| 3,755,264 | 8/1973 | Testa .................... 260/78.5 R |
| 3,879,288 | 4/1975 | Siegele .................. 210/58 |
| 3,880,765 | 4/1975 | Watson .................. 252/8.55 D |
| 4,065,607 | 12/1977 | Kurowsky ............... 526/15 |
| 4,126,549 | 11/1978 | Jones et al. ............ 210/58 |
| 4,457,847 | 7/1984 | Lorenc et al. .......... 210/698 |
| 4,522,992 | 6/1985 | Verbrugge ............. 526/272 |
| 4,530,766 | 7/1985 | Hann et al. ............ 210/701 |
| 4,545,920 | 10/1985 | Lorenc et al. .......... 252/180 |
| 4,581,145 | 4/1986 | Cuisia et al. .......... 210/699 |
| 4,710,303 | 12/1987 | Emmons ................ 210/698 |
| 4,710,555 | 12/1987 | Peiffer et al. .......... 526/240 |
| 4,741,400 | 5/1988 | Underdown ........... 166/279 |

FOREIGN PATENT DOCUMENTS

297049A1 12/1988 European Pat. Off. .
1519512 7/1978 United Kingdom .
2213175 12/1988 United Kingdom .

OTHER PUBLICATIONS

M. C. van der Leeden et al. "Development of Inhibitors for Barium Sulfate Deposition", Proceedings of the Third International Symposium on Chemicals in the Oil Industry, Apr. 1988, p. 65.

M. C. van der Leeden et al. "Inhibition of Barium Sulfate Deposition by Polycarboxylates of Various Molecular Structures", SPE Production Engineering, Feb. 1990, p. 70.

K. S. Johnson "Water Scaling Problems–in the Oil Production Industry" Spec. Publ. R. Soc. Chem. vol. 45, 1983 p. 125.

Primary Examiner—Joseph L. Schofer
Assistant Examiner—Wu C. Cheng
Attorney, Agent, or Firm—Larry W. Evans; John E. Miller

[57] ABSTRACT

Polymers are disclosed which comprise the reaction product of (A) at least about 60 weight percent of at least one α, β-unsaturated polycarboxylic acid or anhydride; and (B) about 0.5 to about 40 weight percent of at least one acrylamide represented by the formula VI:

$$CH_2=C(R^5)C(O)N(R^6)R^7 \qquad (VI)$$

wherein $R^5$, $R^6$ and $R^7$ are each independently hydrogen or lower alkyl groups provided that at least one of $R^6$ and $R^7$ is a lower hydro-carbyl group, and further provided that the mixture is free of a vinyl sulfonic acid. The monomers react at elevated temperatures to form polycarboxylate scale inhibitors having a number average molecular weight of from about 400 to 10,000. The polymers have particular application in the inhibition of scales during oil field operations, but also may be employed in any environment where deposition of mineral scales is undesirable.

10 Claims, No Drawings

POLYMERS DERIVED FROM α, β-UNSATURATED POLYCARBOXYLIC ACIDS OR ANHYDRIDES AND N-SUBSTITUTED ACRYLAMIDES, AND USE IN REDUCING SCALE

TECHNICAL FIELD

The present invention relates to methods for reducing the formation of scale in aqueous media and to polymeric materials used in such methods. More particularly, the present invention relates to treatment of aqueous systems with polymers derived from unsaturated aliphatic polycarboxylic acids or anhydrides to reduce the precipitation, or modify the crystal growth, of sparingly soluble salts. The present invention is particularly applicable to the inhibition of scale in oil field production systems during water injection (secondary recovery) procedures.

BACKGROUND OF THE INVENTION

In the recovery of oil from oil-bearing subterranean formations, it usually is possible to recover only minor portions of the original oil in place by the so-called primary recovery methods which utilize only the natural forces present in the formation. A variety of supplemental recovery techniques have been employed in order to increase the recovery of oil from subterranean formations. The most widely used supplemental recovery technique is water flooding which involves the injection of water into the formation. As the water moves through the formation, it acts to drive oil therein toward a production system composed of one or more wells through which the oil is recovered.

It has long been recognized that the chemistry of various waters encountered in oil field operations is such that low solubility compounds are present. Under certain conditions, these sparingly soluble salts may precipitate out and lead to the formation of scale, i.e. hard solid deposits, on walls of pipework, heat exchanger surfaces, valves, vessels and elsewhere in the oil recovery system. Also, the formation of insoluble salts will tend to plug the oil-bearing strata and reduce the chances of obtaining an improvement in the recovery of oil. The problems associated with scale formation in oil production are described in: K. S. Johnson, "Water Scaling Problems in the Oil Production Industry", Soc.Chem., Spec.-Publ.-R. 1983 (45), pp.125-149.

Oil field scales most commonly contain the carbonate and sulphate salts of alkaline earth metals such as calcium, barium and strontium, and often include calcium carbonate (calcite) and barium sulphate (barite). The carbonate scales are most likely to precipitate from formation water (i.e., water that is present within the rock formation) as the pressure drops during production allowing carbon dioxide dissolved in the brine to be released and the pH to increase resulting in carbonate ion formation.

In oil recovery processes where seawater which contains high concentrations of sulfate ion is injected during secondary recovery procedures, the formation water mixes with seawater. Such mixing of incompatible waters can lead to severe scaling problems throughout the production system. This is likely to occur downhole when seawater breakthrough takes place in production wells, and at the surface when fluids from wells producing formation water alone are mixed with fluids from wells which have separate seawater breakthrough. In certain subterranean formations, e.g. those found in the North Sea, the formation water tends to have a low pH and high barium content. In such formations, a rapid deposition of barite will occur at the seawater-formation water interface.

In the production of fluids from formations which are susceptible to such scale formation, the production rates tend to decline steadily as the scale forms. To restore the production rates from such formations, various methods have been used.

In one method, the formations are re-perforated by opening new perforations through the well casings and exposing new formation surfaces. This method can be used to temporarily restore production rates, but is subject to further plugging of the formation by additional scale. Also, this method can be relatively expensive and is therefore of limited value in formations where rapid scale deposition occurs.

A second method involves the use of acid to remove scale buildup. While the use of acid treatments is effective in many instances, it does require removal of the well from production for the acid treatment process which is disadvantageous especially if the formation is subject to rapid scale deposition. In addition, the production rate begins to decline after the treatment as more scale is formed so that during much of its producing life the well is producing fluids at a reduced rate. Further, certain scales, such as barite, can not be removed even with conventional oil field acid treatments.

Barite scale represents a particular problem among the mineral scalants due to its extremely low solubility and speed of precipitation. A few methods are available for dissolving barite, but they are very expensive both in terms of the large volumes of fluid circulation and in the down time involved in carrying out a descaling operation. In most instances the barite cannot be removed which results in the additional cost of replacing the scaled-up equipment. When it is not possible to replace scaled oil field equipment that is permanently fixed in a producing well, the formation must be re-perforated as discussed above. Thus, treatment of barite and other scale has focussed on the development and use of scale inhibitors.

It has been proposed to add scale inhibitors to the flood water during water injection and also to topside production systems. Scale inhibitors have also been used for treating scaling problems which often occur at the well bottom or as produced fluids progress up a production well. The only practical method of getting scale inhibitor into these fluids is by the so-called "squeeze" operation. The squeezing technique consists of reverse flowing a production well by applying excess pressure from the surface facility and adding the scale inhibitor to the reverse flow.

In order to be cost-effective, a scale inhibitor must meet various criteria. A good scale inhibitor should either: (1) retard the precipitation of sparingly soluble salts; or (2) modify the properties of the scale crystals (e.g., their shapes and tendencies to disperse) to reduce crystal adherence on walls and to facilitate their disposal as sludge. In addition, to be suitable for oil field water applications, a scale inhibitor should efficiently inhibit scale formation in environments characterized by high temperature, low pH and high concentrations of divalent and trivalent metal ions (i.e., high ionic strength). A cost-effective scale inhibitor should also be effective at a concentration within the range of 10 to about 500 ppm.

Prior to the present invention, scale inhibitors have been developed and used with varying degrees of success to inhibit scale during oil field operations. Examples of such inhibitors which are commercially available include "Bellasol S-29/S-40", (a partial sodium salt of a polyacrylic acid from Ciba-Geigy), and "QR-980" (a partial sodium salt of a copolymer of an acrylate and methacrylic acid available from Rohm & Haas). These inhibitors have not been completely satisfactory in their performance or cost. Certain inhibitors are not effective at low use levels, in low pH, or high temperature environments. Moreover, none have been found to be satisfactory for inhibiting barium sulphate scale, when the barium ion concentration is greater than about 500 ppm.

There have been a number of attempts to develop scale inhibitors for barium sulphate which operate in low pH, high temperature and high salinity environments. For example, N. C. van der Leeden et al., "Development of Inhibitors for Barium Sulphate Deposition", *Proceedings of the Third International Symposium on Chemicals in the Oil Industry.* (1988) 65-84, disclosed that introduction of sulphonated vinyl segments in a polymaleic based polymer would increase the effectiveness at low pH values. Also, N. C. van der Leeden et al., "Inhibition of Barium Sulphate Deposition by Polycarboxylates of Various Molecular Structures" *Society of Petroleum Engineers: Production Engineering,* (Feb. 1990) 70-76, disclosed a study of the relationship between the molecular structure of polycarboxylates and their growth-retarding influence on barium sulphate. Two types of polycarboxylates with a molecular structure based on either polyacrylic or maleic acid were studied.

Copolymers of maleic anhydride and acrylamide or methacrylamide, and terpolymers comprising maleic anhydride, acrylamide or methacrylamide and other copolymerizable monomers have been suggested as scale control agents. Examples of some publications describing such polymers and their use as scale control agents include U.S. Pat. Nos. 4,065,607 and 4,126,549; UK Patent 1,519,512; and EP 297,049. European patent application 297,049 describes polymers based on vinyl sulfonates which are reportedly useful in inhibiting barium sulfate scale deposition from aqueous systems. The comonomers which may be reacted with the vinyl sulfonate include maleic acid or maleic anhydride and/or comonomers such as acrylamide, N,N-dimethylacrylamide, styrene, etc.

There continues to be a need for a cost-effective scale reducing systems that are effective for inhibiting barium sulphate and other scale from oil production systems and subterranean formations with environments characterized by high temperature, high concentrations of divalent and trivalent metal ions, and low pH.

SUMMARY OF THE INVENTION

The present invention relates to polymers derived from α, β-unsaturated polycarboxylic acids or anhydrides and one or more hydrophylic N-substituted acrylamides. The present invention also relates to the discovery that such polymers exhibit desirable scale reduction properties with respect to barite and other scales in high temperature, high ionic strength and low pH environments. The result is surprising in view of the tendency of many known scale inhibitors to lose their effectiveness in such environments. More particularly, the present invention relates to polymers which comprise the reaction product of a mixture of monomers comprising (A) at least about 60 percent by weight of at least one α, β-unsaturated polycarboxylic acid or anhydride and (B) from about 0.5 to about 40 percent by weight of at least one acrylamide represented by the formula $$CH_2=C(R^5)C(O)N(R^6)R^7 \qquad (VI)$$

wherein $R^5$, $R^6$ and $R^7$ are each independently hydrogen or a lower hydrocarbyl group provided that at least one of $R^6$ and $R^7$ is a lower hydrocarbyl group, and further provided that the mixture is free of a vinyl sulfonic acid.

DETAILED DESCRIPTION

The term "hydrocarbyl", when used throughout this specification and in the appended claims, denotes a linear, branched, or cyclic group having a predominantly hydrocarbon character, but which may contain non-hydrocarbon substituents, or may be interrupted by atoms other than carbon, in an amount which does not alter the predominantly hydrocarbon character of the group. Those skilled in the art will be aware of suitable substituents and atoms; examples are:

1. Substituents such as halo, nitro, cyano, amino, hydroxy, as well as other forms of oxygen such as carboxyl, oxy, carbonyl, etc.
2. Hetero atoms such as oxygen, phosphorus, nitrogen, sulfur and silicon, whereby the hetero atoms, if any, are not linked directly to each other.

In one embodiment, the term "hydrocarbyl" contemplates a linear or branched chain containing zero to about three substituents or hetero atoms present for each 10 carbon atoms, and preferably zero to one substituent or hetero atom for each 7 carbon atoms. Thus, in certain instances the term "hydrocarbyl" denotes a linear or branched alkyl group.

The term "lower" as used in the present specification and claims, when used in conjunction with terms such as alkyl or hydrocarbyl, is intended to describe such groups which contain a total of up to 7 carbon atoms.

The term "hydrophylic", when used in conjunction with the monomeric amides disclosed herein, is intended to describe the tendency or property of such monomers to be wettable or otherwise have an affinity for water.

The terms "cationic group" and "salts", when used throughout the specification and in the appended claims generally denote alkali metal cations such as sodium, potassium, and lithium, but also includes ammonium ions and addition salts such as mono-, di-, and trialkylamines, pyridine, morpholine and lutidine.

The polymers of the present invention are prepared from a mixture of two or more monomers comprising:

(A) at least about 60 weight percent of at least one dicarboxylic compound represented by the following formulae (IV) or (V):

$$R^1-OOC(R^3)C=C(R^4)COO-R^2 \qquad (IV)$$

or $$\overline{OC(R^3)C=C(R^4)COO} \qquad (V)$$

wherein in formulae (IV)-(V), $R^1$ and $R^2$ are each independently hydrogen a lower hydrocarbyl group or a cationic group, and $R^3$ and $R^4$ are each independently hydrogen or a lower hydrocarbyl group; and (B) About 0.5 to about 40 weight percent of at least one amide compound represented by the following formula (VI):

$$CH_2=C(R^5)C(O)N(R^6)R^7 \qquad (VI)$$

wherein in formula (VI) $R^5$, $R^6$ and $R^7$ are each independently hydrogen or a lower hydrocarbyl group provided that at least one of $R^6$ and $R^7$ is a lower hydrocarbyl group, and further provided that the mixture of monomers is free of a vinyl sulfonic acid. The term "a vinyl sulfonic acid" includes compounds represented by the formula

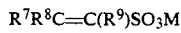

$$R^7R^8C=C(R^9)SO_3M$$

Wherein $R^7$, $R^8$ and $R^9$ are independently hydrogen, $CO_2M$, an alkyl group of one to four carbon atoms or phenyl, and M is hydrogen, an alkali- or alkaline earth metal, ammonium or an amine residue.

In one embodiment, monomer (B) comprises at least one compound wherein $R^5$ and $R^6$ are independently hydrogen or methyl and $R^7$ is methyl.

In another embodiment, component (A) has a cis configuration represented by the following formula (VIII):

wherein in formula (VIII) $R^1$ and $R^2$ are each independently selected from hydrogen, a lower hydrocarbyl group, or a cationic group, and $R^3$ and $R^4$ are each independently hydrogen or a lower hydrocarbyl group.

The monomers of (A) are available commercially and can also be prepared by a variety of methods known in the art. One method comprises the catalytic oxidation of benzene over vanadium pentoxide as shown by Bhattacharyya et al, *J. Appl. Chem.* (London), Vol. 8, 728 (1958). Other compounds of component (A) are prepared by the oxidation of furfural with sodium chlorate in the presence of vanadium pentoxide as shown in Milas, *Org. Syn.*, Coll. Vol. II, 302 (1943). Examples of specific monomers useful as monomer (A) in the present invention include maleic anhydride, maleic acid, methyl maleic acid, ethyl maleic acid, methyl ethyl maleic acid, fumaric acid, salts thereof, anhydrides thereof and the like.

The N-substituted acrylamide, monomer (B), useful in the preparation of polymers of the present invention are those acrylamides represented by the formula VI described above. As noted therein, $R^5$, $R^6$ and $R^7$ may be lower hydrocarbyl groups, and specific examples of such groups include methyl, ethyl, propyl, butyl, etc. Specific examples of the N-substituted acrylamides useful in the present invention include N-methylacrylamide, N-methylmethacrylamide, N-ethylacrylamide, N-ethylmethacrylamide, N,N-dimethylacrylamide, N,N-dimethylmethacrylamide, N,N-diethylacrylamide, N,N-diethylmethacrylamide, etc. A preferred example of the acrylamides for the present invention is N,N-dimethylacrylamide.

In another embodiment, the invention pertains to polymers that comprise:

(A) up to about 99.9 mole percent of reoccurring moieties represented by the following formulae (I) or (II):

or

or mixture thereof wherein in formula (I) $R^1$ and $R^2$ are independently selected from hydrogen, a lower hydrocarbyl group or a cationic group, and $R^3$ and $R^4$ in formulae (I)–(II) are independently selected from hydrogen or a lower hydrocarbyl group; and (B) at least about 0.1 mole percent of reoccurring moieties represented by the following formula (III):

wherein $R^5$ is selected from hydrogen or a lower hydrocarbyl group and $R^6$ and $R^7$ are independently selected from hydrogen or a hydrocarbyl group provided that at least one of $R^6$ or $R^7$ is a hydrocarbyl group, and further provided that the polymer is free of moieties derived from a vinyl sulfonic acid.

In one preferred embodiment, in formula (III), $R^6$ and $R^7$ are lower alkyl groups preferably methyl groups.

In another embodiment, the polymers of the present invention comprise from about 30 to about 70 mole percent of reoccurring moieties having formulae (I) or (II) or mixture thereof, and from about 30 to about 70 mole percent of reoccurring moieties having formula (III).

The polymers of the present invention which are obtained by reacting an $\alpha$, $\beta$-unsaturated dicarboxylic acid or anhydride with the above-described N-substituted acrylamides are hydrolyzed on contact with water. Where the polymer is prepared utilizing the anhydride of formula II, the anhydride moieties and the polymer are hydrolyzed to the diacid. It also has been observed that the hydrolysis of the polymer also results in hydrolysis of at least some of the moieties derived from the N-substituted acrylamide. The amide groups are hydrolyzed to carboxylic acid groups.

The hydrolysis reaction can be effected at the conclusion of the polymerization reaction which is discussed more fully below or hydrolysis can occur when the polymers of the present invention are added to the aqueous systems to reduce the formation of scaling from the aqueous systems. Accordingly, the polymers and salts of the present invention may comprise, in addition to the reoccurring moieties represented by formulae I, II and III, (C) reoccurring moieties represented by the following formula VII:

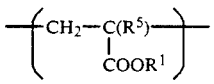

$$\left[ CH_2-C(R^5) \atop COOR^1 \right] \quad (VII)$$

wherein $R^1$ is hydrogen, a lower hydrocarbyl group or a cationic group, and $R^5$ is hydrogen or a lower alkyl group.

In one embodiment of the present invention, the polymers comprise from about 30 to about 70 mole percent of (I), (II) or mixtures thereof; from about 1 to about 20 mole percent of the moieties represented by (III) and from about 20 to about 50 mole percent of the reoccurring moieties represented by formula VII.

The polymers of the invention can be prepared by any of a number of methods known in the art including those set forth in the Encyclopedia of Polymer Science & Engineering, Vol. 9, 2nd edition, Wiley & Sons, p. 231. In one aspect, the polymers of the invention are prepared by solution polymerization where the monomers are polymerized in a suitable solvent employing a suitable free-radical initiator. The reaction temperature is typically that of refluxing solvent and is usually within the range of 75° to about 300° C. The upper limit of the range will depend upon the controllability of the reaction rate and or the reflux temperature of the solvent or mixture thereof.

Those skilled in the art will be aware of suitable solvents for use in the present process. Suitable solvents include: hydrocarbons, halogenated hydrocarbons, ketones and ethers. Representative solvents which may be used in preparing the polymers of the invention are aromatic hydrocarbons such as benzene, toluene, xylene, ethyl benzene, p-cymene and the like; alkanes such as heptane, octane, nonane and the like; cycloalkanes such as cyclopentane, cyclohexane and the like; halogenated aromatics such as chloro, bromo, or iodobenzene and the like; halogenated alkanes such as ethylene dichloride, methylene dichloride, carbon tetrachloride, and the like; ketones such as acetone, methyl ethyl ketone and di-ethyl ketone, and the like; and ethers such as di-ethyl ether, tetrahydrofuran, and the like; and admixtures of such solvents. When the polymerization reaction is conducted in a hydrocarbon solvent, particularly an aromatic solvent such as toluene or xylene, catalyst and solvent moieties become attached to the polymer as end-capping groups. For example, when toluene is the solvent and lauryl peroxide is the catalyst, the polymer obtained contains attached $C_{12}$ hydrocarbon groups from the peroxide and aromatic groups (e.g., benzyl groups) from the toluene. Up to about 10 mole percent of each of the moieties are bonded to the polymer, and more often the polymer will contain from about 1 to about 10 mole percent of each of the moieties.

Any conventional free-radical initiator can be used as the initiator of polymerization including organic peroxides, peresters, peracids, percarbonates, persulfates, azo compounds and the like. Examples of such compounds include lauryl peroxide, benzoyl peroxide, dicumyl peroxide, acetyl peroxide, caprylyl peroxide, di-tertbutyl peroxide, diisopropyl percarbonate, dicyclohexyl percarbonate, sodium or potassium persulfate, hydrogen peroxide, t-butyl hydroperoxide, as well as azoisobutyronitrile, and the like. In general, the total initiator used should be at least 1 percent by weight of the total monomeric material in order to achieve the desired yield. There is no specific upper limit on the amount of initiator, however, there is no advantage in using more than about 20 percent, any excess being wasted.

In another aspect of this invention, the polymers can be prepared from the half salt or ester of the α, β-unsaturated polycarboxylic acid and the N-substituted acrylamide in aqueous solution. Any suitable free radical initiator may be employed as above. The reaction conditions are generally reflux, but the reaction can be accomplished at any temperature above the decomposition temperature of the initiator, generally from about 75° to about 300° C.

It is also desirable to follow the conventional procedure of eliminating oxygen from the atmosphere with which the monomeric solutions are in contact while the polymerization is occurring. This can be accomplished by the usual procedure of purging the polymerization vessel with argon, nitrogen or other inert oxygen-free gas and closing the vessel, or for an open vessel continuing a slow flow of the inert gas through the vessel throughout the polymerization reaction. Any conventional mixing device can be used such as a rotator or propeller to achieve the desired rapid and complete mixing of the reactants.

The total reaction time period is generally within the range of about 2 to about 16 hours and more frequently is approximately 4 to about 8 hours.

The polymers can be used in many applications without purification or isolation. Isolation of the polymer, if desired, can be accomplished by any of the standard techniques available and known to art. The usual methods include concentration of the reaction medium by evaporation, or decanting the solvent from a precipitated polymer, followed by filtration and subsequent slurrying of the filtered solids with methanol to dissolve unreacted monomer.

When the polymer is prepared from an anhydride monomer (II) in an organic solvent, the initial polymer product is hydrolyzed to the acid by the addition of excess water followed by heating (60°–80° C.) for 2 to about 8 hours. The resulting aqueous solution of polymer is neutralized with a base ($NH_4OH$, NaOH, KOH, etc.) to a pH of about 8 to form a salt, and the polymer salt is precipitated by the addition of excess (e.g., 10×volume) of methanol. Filtration and drying yield the final solid polymer.

In the case of half salt monomers and aqueous media, the final polymerization solution is precipitated directly in excess (e.g., 10× volume) methanol and isolated as above. This will yield polymers substantially free of unreacted monomer.

Aqueous concentrates of the polymer may be prepared by dissolution in the oil field injection water, or other water, at the concentration desired, usually greater than ten percent by weight. The process for dissolution of the solid polymer to soluble, hydrolyzed polymer usually requires ½ to about 5 hours. Polymers prepared by the aqueous method could be used directly by simple dilution to the appropriate concentration.

The proportion of the reagents employed in the polymerization can be varied to a considerable extent, depending primarily upon the particular composition of the polymer desired. It will also be appreciated by those skilled in the art that various mixtures of monomers (A) and (B) described above can be used in formulating the components charged to the reaction vessel. It will be further appreciated by those skilled in the art that monomer (A) may contain minor amounts of monomers not specifically set forth above. For example, monocarboxylic acid monomers such as acrylic acid, methacrylic acid, and the like, may be used in conjunction with the monomers of formulae (I) and/or (II).

Generally, proportions by weight of monomer (A) to monomer (B) of about 3:2 to 99:1 and higher can be employed in the reaction used to form the polymers of the invention. It is preferred, however, to employ proportions by weight of monomer (A) to monomer (B) of about 3:2 to about 9:1.

The polymers of the present invention typically have a number average molecular weight within the range of about 400 to about 10,000 and more typically within the range of about 2,000 to about 8,000 as determined by gel permeation chromatography (or size exclusion chromatography). In general, the polymers of the present invention are water-soluble polymers and readily form aqueous solutions whether in the free acid or salt form. How-ever, aqueous mixtures of the polymer also are useful, and "mixtures" includes, in addition to dissolved polymer, polymer suspensions, colloidal dispersions, polymeric gels, emulsions, or microemulsions, and wettable polymeric solids.

In one embodiment, the present invention pertains to a method for reducing the precipitation or deposition from an aqueous solution of sparingly soluble salts, e.g., alkaline earth metal salts, formed by the interaction of a solution containing alkaline earth metal ions with a solution containing carbonate and/or sulfate ions, usually under acidic conditions. The method comprises providing therein, the water-soluble polymers of the present invention.

According to a particular embodiment, the invention provides a method for inhibiting or reducing the deposition of alkaline earth metal carbonates and/or sulfates, particularly barium sulfate, during or after primary or secondary oil recovery from water in pipes, vessels or other process equipment or in underground formations which comprises introducing an effective amount of the polymers of the present invention into said water.

The amount of the polymers employed should be sufficient to reduce the scale in the producing well. Normally the amount added to the water will be in the range of at least 5 ppm up to 100 ppm. As much as 200-500 ppm can be used in some instances. The amount of polymer added to the water will depend in part on the concentration of deleterious ions in the water. For example aqueous systems containing high amounts of metals such as barium and calcium require relatively larger amounts of the polymer. The polymers of the present invention are particularly effective in treating injection waters which contain from 500 to 10,000 ppm of barium.

The polymers are effective in reducing scale and can be added to an injection well during a squeeze operation or to wells in a water flood system that will pass through the underground formation to a producing well or wells. Thus, protection is afforded against scale formation in the producing well or wells including the injection well or wells. This protection is especially useful in a number of areas where scaling of metal surfaces, particularly ferrous metal surfaces, by barium sulphate, calcium sulphate and/or calcium carbonate is a problem. By control (i.e., reduction) of scale formation, breakdowns, maintenance, cleaning and repairs caused or necessitated by scale formation can be minimized.

In the practice of the invention, the polymers of salts of the invention are introduced directly to the site of deposition, or potential deposition by dissolving or suspending in any injection water, e.g., sea water or recycled formation water, by separate injection at or near the bore hole, or by backwashing the well with an aqueous solution of the polymer under pressure to force the solution into the formation, as in a squeeze operation. The invention is of particular value for the reduction of barium sulfate scale in water containing barium obtained from certain underground formations. The reduction may be in the production of insoluble solids or in the deposition of those solids in an inherent form, e.g., as scale, such as by modifying the crystal growth of the solid.

The individual polymers of the present invention or mixtures of any of the polymers can be utilized in the method of the invention. Additionally, one or more polymers of the present invention can be employed in conjunction with one or more commercial scale inhibitors (both low molecular weight and polymeric types) and in the presence of one or more additives. Examples of additives include viscosification agents, surfactants, corrosion inhibitors, anti-foam agents, sulfide scavengers, oxygen scavengers, biocides and the like, if they are compatible with and do not cause precipitation of the polymers of the present invention.

The method of the present invention may be carried out utilizing injection and production systems as defined by any suitable arrangement of wells. Such well arrangements include those as set forth in U.S. Pat. No. 3,927,716 as well as other arrangements known in the art.

An advantage of the method of the present invention is that it can be practiced in oil fields having relatively high temperatures, high pressures, high salinity, high concentrations of divalent and trivalent metal ions, and both high and low pH. The polymers according to the present invention are particularly effective for preventing the formation of barium sulphate scale deposited by aqueous fluids (produced or injected) having a pH below 5.0. Usually the pH will be in the range of 5.5 to about 3.0. Additionally, the polymers of the present invention are also effective in treating water used in industrial aqueous systems such as steam generating boilers, hot water heaters, heat exchangers, cooling towers, desalination systems, cleaning systems, pipelines, gas scrubber systems, and associated equipment containing various impurities.

In order that those skilled in the art will be better able to practice the invention, the following examples are given by way of illustration and not by way of limitation. Unless otherwise noted, all percentages are by weight. All temperatures are in degrees Centigrade and if not specified are ambient temperature.

EXAMPLE 1

An eight-ounce Boston Round Bottle equipped with a screw cap having a Teflon liner is charged with 13.5 gms of maleic anhydride, 1.5 gms of N,N-dimethylacrylamide, 60 gms of toluene and 1.9 gms of lauryl peroxide. This 15 gram monomer charge is 10 percent N,N-dimethylacrylamide. The resulting mixture is purged with argon gas to exclude oxygen, sealed and tumbled for about 8 hours at 80° C. After tumbling and cooling, the polymer precipitates, and the toluene is removed by decanting. Thirty gms of water is then added to the polymer which is then tumbled for 3 hours at 80° C.

The polymer is precipitated with excess methanol containing 16.65 grams (1.5 equivalents) of 50% aqueous sodium hydroxide. The polymer is recovered by filtration, washed with excess methanol, and dried under reduced pressure at 50° C. for 48 hours. The recovered polymer (7.15 gms) is soluble in water.

EXAMPLE 2

An eight ounce Boston Round Bottle equipped with a screw cap having Teflon liner is charged with 12.75 gms of maleic anhydride, 2.25 gms of N,N-dimethylacrylamide, 60 gms of toluene and 1.9 gms of lauryl peroxide. This monomer charge is 15 percent N,N-dimethylacrylamide. The resulting mixture is purged with argon gas to exclude oxygen, sealed and tumbled for about four hours at 80° C. An orange-brown solution is formed with some precipitate on the walls of the bottle. The toluene is decanted from the bottle, and 30 gms of water are added to the polymer which is then tumbled at 55° C. overnight. The polymer is precipitated from the solution with excess methanol containing 15.7 gms (1.5 equivalents based on maleic anhydride) of 50 percent aqueous sodium hydroxide, filtered, washed with methanol, and vacuum dried at 50° C. for about 48 hours.

EXAMPLES 3-7

For Examples 3 and 5, the general procedure for Example 1 is repeated and for Examples 4, 6 and 7 the procedure of Example 2 is repeated except that the percentage of N,N-dimethylacrylamide included in the monomer charge is varied in the Examples as indicated in the following Table I. The amount of sodium hydroxide in the excess methanol utilized to precipitate the product is maintained at 1.5 equivalents.

TABLE I

| Example | Maleic Anhydride gms | N,N-dimethyl-acrylamide gms | % charge | 50% NaOH gms |
|---|---|---|---|---|
| 3 | 12.0 | 3.0 | 20 | 14.80 |
| 4 | 11.25 | 3.75 | 25 | 13.83 |
| 5 | 10.5 | 4.5 | 30 | 12.85 |
| 6 | 9.75 | 5.25 | 35 | 11.99 |
| 7 | 9.0 | 6.0 | 40 | 11.03 |

The following examples illustrate preparation of polymers of the present invention utilizing different hydrolysis and recovery procedures.

EXAMPLE 8

An eight ounce bottle as utilized in Example I is charged with 10.5 gms of maleic anhydride, 4.5 gms of N,N-dimethylacrylamide, 60 gms of toluene, and 1.9 gms of lauryl peroxide. The acrylamide constitutes 30 percent of the monomer charge. The resulting mixture is purged with argon to exclude oxygen, sealed and tumbled at 80° C. for about 5 hours. After cooling, 30 gms of water is added to the bottle which is then tumbled for 3.75 hours at 50° C. The toluene phase is removed, and the polymer is precipitated from the aqueous phase with excess methanol containing 1.5 equivalents of sodium hydroxide. The polymer is recovered by filtration, washed with excess methanol, and dried under reduced pressure at 50° C.

EXAMPLE 9

The procedure in Example 8 is repeated except that the polymer which is recovered by precipitation with excess methanol is allowed to stand in methanol for about 3 days prior to recovery by filtration.

EXAMPLE 10

The general procedure of Example 1 is repeated except that on completion of the initial tumbling reaction, 30 gms of water are added and this mixture is tumbled for 5 hours at 80° C. The precipitate which is formed by the addition of excess methanol containing 1.5 equivalents of sodium hydroxide is allowed to stand in methanol for about 3 days and then filtered, washed and dried.

The polymers of some of the Examples were analyzed by NMR, and the results are summarized in the following Table II.

TABLE II

| | Polymer Salt Composition | | | | | |
|---|---|---|---|---|---|---|
| Example | $Na_2MAA$ | N,N-DMAM* | NaAA* | Aromatic* | Lauryl* | Molecular** Weight |
| 1 | 56.7 | 3.9 | 31.1 | 1.7 | 6.7 | 3600 |
| 3 | 50.9 | 6.1 | 37.3 | 0.9 | 4.9 | 6050 |
| 5 | 47.2 | 8.9 | 39.3 | 0.6 | 3.7 | 7900 |
| 8 | 45.6 | 15.8 | 34.2 | 0.6 | 3.9 | — |
| 9 | 47.5 | 14.7 | 33.9 | 0.6 | 3.3 | — |
| 10 | 48.0 | 6.8 | 41.6 | 0.5 | 3.1 | — |

*Mole percent of moieties estimated by NMR
**Number average molecular weight

The polymers prepared in Examples 1-10 were evaluated for scale reduction by the following test procedure.

STATIC PRECIPITATION TEST METHOD

General Procedure

1. Preparation

A. All glassware is thoroughly cleansed with 50 percent nitric acid solution followed by several washing/rinsing with deionized water.

B. Stock solutions of synthetic "Formation Water (FW)" and "North Sea Water (NSW)" are prepared separately according to a specific formulation (mineral content) using deionized water. The FW and NSW stock solutions are then adjusted to the required pH by bubbling carbon dioxide gas or adding hydrochloric acid (to lower the pH) or Nitrogen gas (to raise the pH) through the solution as appropriate.

(i) The "FW" contains 615 ppm $Ca^{++}$, 65 ppm $Sr^{++}$, 1000 pp $Ba^{++}$ and 4 ppm $SO_4^=$.

(ii) The "NSW" contains 430 ppm $Ca^{++}$, 8 ppm $SR^{++}$, 0.0 ppm $Ba^{++}$ and 3000 ppm $SO_4^=$.

C. A stock solution of each scale inhibitor (SI) polymer to be tested is prepared by quantitatively dissolving scale inhibitor in deionized water (2% w/w based on active polymer component) and the resulting solution is adjusted to pH 6.0.

2. Test Method

A. NSW Test Bottle

The required amount of NSW is added (e.g., 60 mls) to new 120 mls glass powder bottles (previously washed with nitric acid and rinsed thoroughly with deionized water). The NSW water is adjusted to pH 4.5 by addition of concentrated hydrochloric acid. Then an appropriate amount of the scale inhibitor polymer (e.g., 1 ml of previously prepared solution of 2% w/w to achieve 200 ppm SI conc.). The bottle is then placed in an oven preheated to 95° C.

B. FW Preparation

A large quantity of FW (enough to carry on the planned number of tests) is adjusted to pH 4.5 with concentrated hydrochloric acid, placed in the oven, and heated to about 55° C.

C. Addition of FW to NSW (A+B)

After the removal of the NSW test bottles from the oven (after reaching 90° C.), 40 mls of the FW (after reaching 55° C.) is immediately added to each NSW test bottle. The bottles are then placed in the oven (preheated to 90° C.) for 2 hours.

3. Sampling

A. Deionized water (e.g., 19.4 ml) is measured into each sample vial (previously washed with acid and rinsed with water).

B. Each test bottle (FW/NSW) is removed from the oven while still around 90° C. and an aliquot (approximately 8 mls) of the supernatant removed using a syringe. The sampled liquid is then rapidly filtered through a microporous membrane (e.g., 0.45 micrometer membrane) filter into the sample vial.

C. Blank Bottle

A blank bottle having the proper ratio of the FW and NSW but with no scale inhibitor is always run along with samples.

4. Analysis

A. Each sample vial is shaken and analyzed for scaling ions (e.g., Ba, Ca, and Sr) either by the Atomic Absorption Spectrometer or Inductively Coupled Plasma technique.

5. Calculation of Results

A percentage efficiency value for a scale inhibitor polymer is calculated as follows using the analytical data:

$$\% \text{ Efficiency} = \frac{[\text{ions] Sample} - [\text{ions] Blank}}{[\text{ions] Theoretical Sample} - [\text{ions] Blank}} \times 100$$

where:

[ions] sample = Conc. of ions measured (found) in the sample vial.

[ions] blank = Conc. of the same ions in the blank (no scale inhibitor added).

[ions] theoretical = The theoretical conc. of ions which could be held in the solution for a particular ratio (i.e., starting ion conc.)

The results obtained for the polymers of Examples 1-10 and Bellasol S-29 tested at a polymer concentration of 400 ppm are summarized in Table III:

TABLE III

| Product of Example | Scale Reduction Efficiency Percent Efficiency | | |
|---|---|---|---|
| | Barium | Strontium | Calcium |
| None | | | |
| 1 | 76 | 100 | 76 |
| 2 | 63 | 67 | 8 |
| 3 | 78 | 100 | 76 |
| 4 | 74 | 78 | 0 |
| 5 | 89 | 100 | 89 |
| 6 | 86 | 89 | 0 |
| 7 | 73 | 78 | 0 |
| 8 | 76 | 79 | 0 |
| 9 | 71 | 69 | 0 |
| 10 | 76 | 79 | 0 |
| Bellasol S-29 | 14 | 67 | 67 |

The polymer prepared in Example 5 was evaluated for scale reduction by the following test procedure.

STATIC PRECIPITATION TEST METHOD

Modified Procedure

Materials

1. Brines

Stock solutions of synthetic brines including "Formation Water (FW)" and "North Sea Water (NSW)" are prepared for use in the tests. The chemical analysis of the FW, and that of the NSW are shown in Table IV. Also shown are the estimated salt compositions corresponding to these elemental analyses.

The bicarbonate is excluded from the synthetic FW because it does not remain stable under ambient laboratory conditions. The results obtained with FW containing bicarbonate are Comparable with those realized with FW prepared without bicarbonate so long as the inhibition efficiency is determined at the same pH.

TABLE IV

| Composition Of Synthetic Brines For Use In Modified Procedure | | |
|---|---|---|
| | Concentration: g/L | |
| | North Sea Water | Formation Water |
| Actual Elemental Analyses: | | |
| Na | 10.890 | 28.780 |
| K | 0.460 | 1.830 |
| Mg | 1.368 | 0.115 |
| Ca | 0.428 | 1.060 |
| Sr | 0.008 | 0.110 |
| Ba | 0.0 | 1.050 |
| SO$_4$ | 2.960 | 0.0 |
| HCO$_3$ | 0.124 | 2.090 |
| Cl | 19.700 | 47.680 |
| Estimated Salt Compositions: | | |
| NaCl | 23.960 | 71.154 |
| KCl | 0.877 | 3.489 |
| MgCl$_2$.6H$_2$O | 11.441 | 0.963 |
| CaCl$_2$.2H$_2$O | 1.570 | 3.889 |
| SrCl$_2$.6H$_2$O | 0.024 | 0.335 |
| BaCl$_2$.2H$_2$O | 0.0 | 1.867 |
| Na$_2$SO$_4$ | 4.377 | 0.0 |
| NaHCO$_3$ | 0.171 | (2.878)* |
| Specific Gravity: | 1.0239 | 1.0543 |

*Note: Exclude the bicarbonate from the FW for the purposes of these tests.

2. Inhibitor

The polymer of Example 5 is prepared as a 2% solution. The pH is then adjusted to 6.0, and one drop of formaldehyde is added to preserve the solution.

TEST PROCEDURE

1. Preliminary Adjustment of pH of the Brines
   a. North Sea Water

A volume of NSW sufficient for the total number of tests planned is taken from the stock brine. The required amount of NSW (e.g., 60 ml) is added to new 125 ml laboratory media bottles (Wheaton) which are equipped with Teflon-lined caps. The pH of each bottle of NSW is adjusted to within 0.05 pH units of 8.0, 7.0, 6.0, 5.5, 5.0, 4.5 and 4.0 respectively with a 1.0 Molar HCl solution. The bottles are capped.

b. Formation Water

A volume of FW sufficient for the total number of tests planned is taken from the stock brine and adjusted to pH 4.5 with a 1.0 Molar HCl solution. The required amount of FW (e.g., 40 ml) is added to 125 ml laboratory media bottles (Wheaton) which have been previously washed with either 1:1 $HNO_3$ or 1:1 HCl. The bottles are left open until the inhibitor (INH) is added and the pH of the mixture readjusted.

2. Introduction of Inhibitor

Sufficient inhibitor (INH) solution is added to the Test Bottles containing the formation water (FW) to achieve a final dosage of 200 mg/L for the NSW-FW mixture.

For the "Blank", distilled water at its natural pH is used. The precipitation of $BaSO_4$ in the absence of an inhibitor is not sensitive to pH over a very wide range of values. The volume/weight of water added is the same as that for the 200 mg/L inhibitor dosage.

3. Readjust pH of the FW/Inhibitor Mixture

The pH of the FW/Inhibitor mixture in the Test Bottles is checked and readjusted accordingly to within 0.05 pH units of the desired final pH. Either 0.05 Molar HCl or 0.10 Molar NaOH is used as the case may be. The bottles are then capped.

4. Preheat the Brines

The bottles containing NSW and FW are placed in a preheated oven set at 95° C. The brines are allowed to reach temperature, and then maintained at 95° C. for another 25-30 minutes. This step requires precalibration of the oven to determine how long it takes to heat 60 ml of NSW and 40 ml of FW to 95° C. in the particular preheated oven set at 95° C. The difference in time required to reach the temperature between the two brines due to their difference in volume is usually about 5 minutes. The extra storage time of 25-30 minutes above is intended to compensate for this difference, and for other variations resulting from carrying out different number of tests in the same oven.

5. Mix the Two Brines Together

Each pair of Test Bottles, one containing the NSW, the other containing the FW/Inhibitor solution is taken out of the oven one at a time. The caps are removed from the pair of bottles and the NSW is poured into the bottle containing the FW/Inhibitor solution; not the other way around. The cap is replaced and the two brines, now inside the FW/Inhibitor solution bottle, are mixed thoroughly before returning the bottle to the oven. Another pair of bottles is then taken out of the oven and the process is repeated until all the brines in the test have been mixed. The test bottles are placed back in the oven for two hours.

6. Sampling of the Supernatant

A quantity (2-5 ml) of the hot supernatant is drawn from each Test Bottle soon after taking it out of the oven, and is filtered through a 0.2 micron membrane. A disposable syringe/acrodisc filter assembly is most convenient for this purpose. The filtrate is then diluted immediately to the dilution required for assay before the supernatant cools.

7. Measure the End pH of the Supernatant

The pH of the supernatant in the Test Bottles is determined after they have cooled down overnight to ambient laboratory temperature. Except for the "Blank" without inhibitor, the end pH should be within 0.10 pH units of the original pH.

The test results obtained are detailed in Table V below.

TABLE V

Effect Of pH On Inhibitor Performance

| pH of Brines | | | |
|---|---|---|---|
| FW/INH[1] | NSW | Mix (end) pH[2] | % Barium Efficiency[3] |
| 4.5 | 8.0 | 6.7 | 22 |
| 4.5 | 7.0 | 6.4 | 25 |
| 4.5 | 6.0 | 4.9 | 30 |
| 4.5 | 5.5 | 4.7 | 31 |
| 4.5 | 5.0 | 4.5 | 17 |
| 4.5 | 4.5 | 4.4 | 18 |
| 4.5 | 4.0 | 4.2 | 5 |
| 5.0* | 5.0 | 5.0 | 39 |

[1] FW/Inhibitor mixture adjusted of pH = 4.5 (*exception) before heating: FW Barium Concentration 1000 ppm; Inhibitor prepared as 2% solution adjusted to pH = 6.0; Inhibitor dosage 200 ppm

[2] Mix (end) = NSW:FW/INH ratio of 60:40 by volume; pH measured after bottles have cooled down overnight

[3] % Efficiency = $\frac{[ions] \text{ Sample} - [ions] \text{ Blank}}{[ions] \text{ Theoretical Sample} - [ions] \text{ Blank}} \times 100$ Although the above examples are limited to only a few of the variables applicable to the compositions and methods within the scope of the present invention, it should be understood that the scope of the present invention can be further appreciated by the description preceding these examples. Therefore, it is to be understood that the invention disclosed herein is intended to cover such modifications as fall within the scope of the appended claims.

What is claimed is:

1. A polymer prepared from a mixture of two or more monomers comprising:
   (A) at least about 60 weight percent of at least one α, β- unsaturated polycarboxylic acid or anhydride or mixtures thereof; and
   (B) about 0.5 to about 40 weight percent of at least one acrylamide represented by the formula:

$$CH_2 = C(R^5)CON(R^6)(R^7)$$

where $R^5$ is hydrogen or a lower alkyl group and each of $R^6$ and $R^7$ is a lower hydrocarbyl group provided that the mixture is free of a vinyl sulfonic acid.

2. A polymer prepared from a mixture of two or more monomers comprising:
   (A) at least about 60 weight percent of at least one compound represented by the following formulae (IV) or (V):

$$R^1 - OOC(R^3)C = C(R^4)COO - R^2 \qquad (IV)$$

or $$\overline{OC(R^3)C = C(R^4)COO} \qquad (V)$$

wherein in formulae (IV), $R^1$ and $R^2$ are independently selected from hydrogen, a lower hydrocarbyl group or a cationic group, and in formulae (IV)–(V) $R^3$ and $R^4$ are independently selected from hydrogen or a lower hydrocarbyl group; and (B) about 0.5 to about 40 weight percent of at least one compound represented by the following formula (VI):

$$CH_2=C(R^5)-C(O)N(R^6)R^7 \qquad (VI)$$

wherein in formula (VI) $R^5$ is hydrogen or a lower hydrocarbyl group and each of $R^6$ and $R^7$ is a lower hydrocarbyl group provided that the mixture is free of a vinyl sulfonic acid.

3. The polymer of claim 2 wherein $R^5$ is hydrogen or a methyl group.

4. The polymer of claim 2 wherein $R^5$ is hydrogen and $R^6$ and $R^7$ are methyl groups.

5. A polymer prepared from a mixture of two or more monomers comprising:
(A) from about 60 to about 75 weight percent of maleic anhydride; and
(B) about 25 to about 40 weight percent of N,N-dimethyl acrylamide or N,N dimethyl methacrylamide, provided that the mixture is free of a vinyl sulfonic acid.

6. A polymer comprising:
(A) up to about 99.9 mole percent of reoccurring moieties represented by the following formulae (I) and (II):

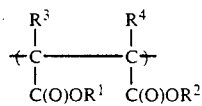

or

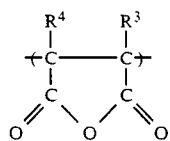

or mixtures thereof wherein in formula (I) $R^1$ and $R^2$ are independently selected from hydrogen, a lower hydrocarbyl group, or a cationic group, and $R^3$ and $R^4$ in formulae (I)–(II) are independently selected from hydrogen or a lower hydrocarbyl group; and (B) at least 0.1 mole percent of reoccurring moieties represented by the following formula (III):

wherein in formula (III), $R^5$ is hydrogen or a lower hydrocarbyl group and each of $R^6$ and $R^7$ is a lower alkyl group provided that the polymer or salt is free of moieties derived from a vinyl sulfonic acid.

7. The polymer of claim 6 also containing
(C) reoccurring moieties represented by the following formula (VII):

wherein $R^1$ is hydrogen, a lower hydrocarbyl group or a cationic group, and $R^5$ is hydrogen or a lower alkyl group.

8. The polymer of claim 6 which comprises about 30 to 70 mole percent of (I), (II) or mixtures thereof and from about 1 to about 60 mole percent of reoccurring moieties having formula (III).

9. The polymer of claim 6 wherein $R^3$ and $R^4$ are hydrogen, $R^5$ is hydrogen or methyl, and $R^6$ and $R^7$ are methyl groups.

10. A polymer obtained by hydrolysis of the polymer of claim 6 and comprising from about 30 to about 60 mole percent of (A), 1 to about 20 mole percent of (B) and about 20–50 mole percent of (C) reoccurring moieties represented by the formula

wherein $R^1$ is hydrogen, a lower hydrocarbyl group or a cationic group, and $R^5$ is hydrogen or a lower alkyl group.

* * * * *